United States Patent [19]
Love

[11] 3,946,301
[45] Mar. 23, 1976

[54] DIRECT CURRENT TO ALTERNATING CURRENT ELECTRONIC INVERTER WITH OVERLOAD AND SHORT-CIRCUIT PROTECTION CIRCUITRY

[75] Inventor: Roger R. Love, Florham Park, N.J.
[73] Assignee: Computer Power, Inc., Madison, N.J.
[22] Filed: Nov. 6, 1974
[21] Appl. No.: 521,515

[52] U.S. Cl. .................................. 321/11; 321/45 R
[51] Int. Cl.² ........................................ H02M 1/18
[58] Field of Search ......................... 321/11, 14, 45

[56] References Cited
UNITED STATES PATENTS

| | | | |
|---|---|---|---|
| 3,327,201 | 6/1967 | Brantley, Jr. ...................... | 321/11 X |
| 3,341,765 | 9/1967 | Rogers, Jr. et al. ............ | 321/45 R X |
| 3,341,766 | 9/1967 | Rhyne, Jr. ...................... | 321/45 R X |
| 3,461,374 | 8/1969 | Rhyne, Jr. .......................... | 321/14 X |
| 3,601,680 | 8/1971 | Beckwith ...................... | 321/45 R X |
| 3,721,836 | 3/1973 | Rippel ............................. | 321/11 X |
| 3,816,809 | 6/1974 | Kuster ............................. | 321/14 |

*Primary Examiner*—William M. Shoop
*Attorney, Agent, or Firm*—Mattern, Ware and Davis

[57] ABSTRACT

A high-efficiency, low-cost D.C. to A.C. electronic inverter generates sinusoidal ouptut voltage(s) by utilization of an oscillator and divider circuitry that generates extremely precise symmetrical control signals. These control signals cause a push-pull amplifier comprising power switch drive transistors to periodically alternately energize power switches comprising two banks of matched output transistors, that in turn generate high current inputs to a ferro-resonant transformer. The transformer is tuned to provide the desired output sinusoidal voltage.

The inverter incorporates unique overload and short-circuit protection electronics that prevent catastrophic destruction of the power switch drive transistors as well as the power switch transistors. Furthermore, to maximize the inverter's efficiency, the power switch driving circuit receives electrical energy from the ferro-resonant transformer in order to insure deep saturation of the power switch transistors. In addition, the push-pull amplifier incorporates further electronics for preventing driving of the power switch drive transistors during failure in the oscillator or divider circuitry.

5 Claims, 7 Drawing Figures

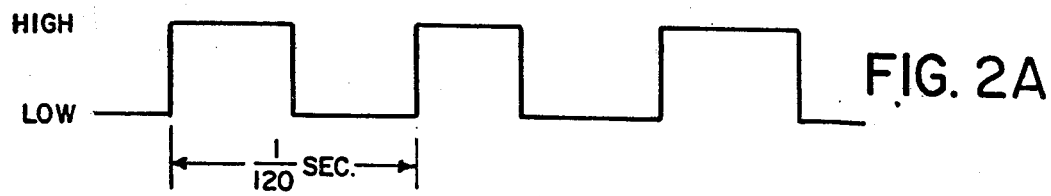
FIG. 2A
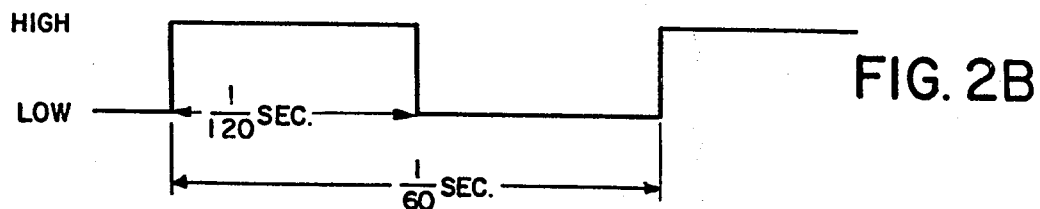
FIG. 2B
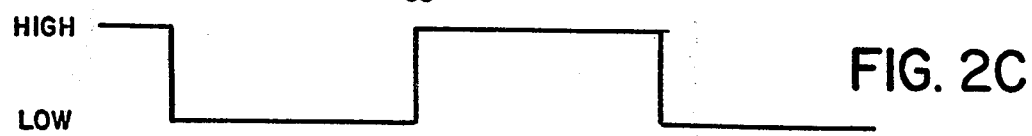
FIG. 2C
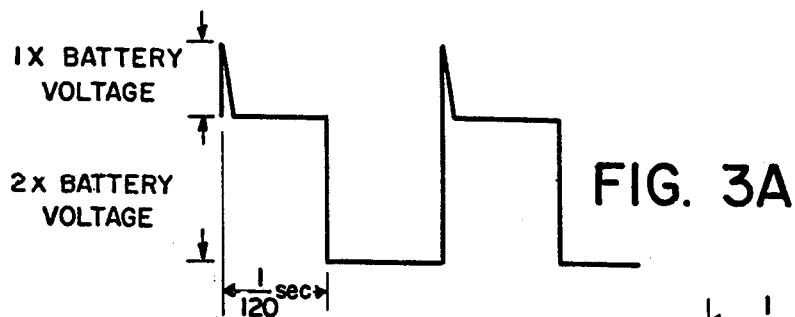
FIG. 3A
FIG. 3B
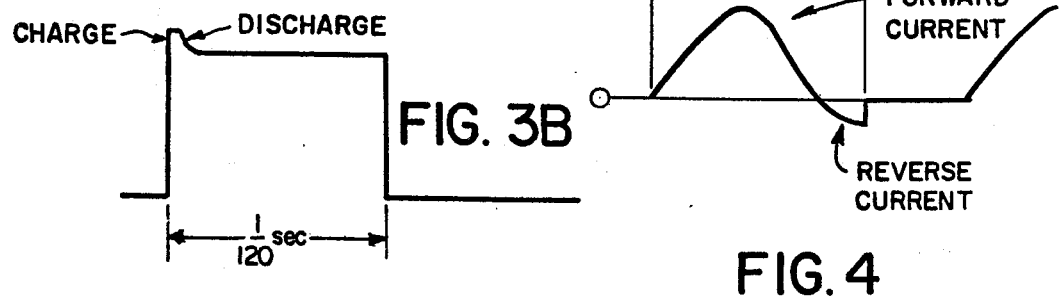
FIG. 4

DIRECT CURRENT TO ALTERNATING CURRENT ELECTRONIC INVERTER WITH OVERLOAD AND SHORT-CIRCUIT PROTECTION CIRCUITRY

BACKGROUND OF THE INVENTION

The need for converting direct current electrical energy to alternating current electrical energy has existed for the greater part of this century due to the advantageous property of alternating current electricity in being able to be readily convertible to other voltages of alternating current by use of transformers. However, most electrical energy storage devices can only store direct current electricity. The prime example of this is, of course, the battery. Thus, if alternating current is desired, and an alternating current generating facility is unobtainable or inoperative, it is generally necessary to use electrical energy stored in a battery and to convert this direct current electricity into alternating current electricity by means of an inverter.

Over the years, several different techniques have been used for converting direct current electricity to alternating current electricity. Some of these devices are electro-mechanical and were commonly found on aircraft. Other inverters have used series resonant parallel filters to shape an electrically or mechanically chopped source of direct current into a sinusoidal voltage. However, the use of series resonant parallel filters generally require the additional use of sensing transformers, comparator circuits and duty cycle control drive circuits in order to sense the output of the series resonant parallel filter and thereby control the power switch circuitry that chops the direct current source of electricity. Such a feedback circuit is required in order to prevent excessive voltage variations on the output of the resonant filter. This particular method of converting direct current electricity to alternating current electricity is extremely expensive, due to the large number of electronic components necessary as well as the need for relatively large electrical components incorporated in the series resonant parallel filter. Furthermore, this series resonant filter generally requires individualized manufacture thereof due to the precise matching of components necessary for the filter to work properly.

Another method of converting direct current to alternating current is by generating a substantially sinusoidal electrical signal by sequentially switching direct current voltages, each voltage at a different level so that when switched in the proper sequence a step-like output signal is obtained that approximates a sinusoidal wave. By filtering this step-like signal, a relatively pure sinusoidal signal is obtainable.

These various methods mentioned all have significant drawbacks with respect to a low-cost, high-efficiency inverter that is capable of supplying external loads in the kilowatt range. The electro-mechanical conversions have the inherent problem of mechanical failure due to wear in the mechanical parts and also the disadvantage of moving parts. The series resonant parallel filter used in the second type of inverter is rather large and is expensive to manufacture. This type of inverter also requires a feedback circuit to regulate the output voltage from this filter. The cost for this type of inverter is several magnitudes greater than the cost of a comparable output inverter according to the present invention. The high frequency switching technique is also several magnitudes more expensive than the present invention and requires a significantly greater number of component parts.

Furthermore, the present invention incorporates overload and short-circuit protection circuitry without the need for fuses or circuit breakers. This circuitry responds so quickly to improper loading that catastrophic failure within the inverter is averted.

The present invention is especially well suited for emergency lighting used during power failures. The invention, while not having the precise voltage, frequency, and waveform purity found on some of the prior art inverters, is able to maintain a relatively constant frequency, constant voltage sinusoidal shaped output voltage within specifications for most devices operating on utility company grade 110 or 220 VAC electricity. Such minor variations in the output voltage, frequency, and waveform thus do not adversely affect most interconnected devices, and especially do not affect electrical lighting systems; and the resultant low cost and high efficiency of the present invention greatly outweighs and minor variations in these above parameters. The sine wave output also tends to reduce the radio frequency interference that is generated in square wave output type inverters.

SUMMARY OF THE INVENTION

The inverters of the present invention are low-cost, high-efficiency devices for the generation of sinusoidal alternating current electricity from a source of direct current electricity. The inverters incorporate an oscillator for generating an electrical signal of twice the frequency of the desired alternating current. This electrical signal is electronically divided by two wherein two precisely symmetrical square wave control signals are produced 180° out of phase with one another. The frequency of these signals is equal to the desired alternating current electricity.

These two symmetrical square waves are amplified by a push-pull amplifier. Within this amplifier, the signals are first electrically amplified to produce a 60 hertz square wave drive signal that energizes the primary side of a driver transformer. The secondary side of the driver transformer in turn energizes power switch drive transistors that each make up the first stage of an emitter follower amplifier. The amplified outputs of these transistors control two banks of power switches that provide high-current switching or currents in both directions, collector to emitter or emitter to collector.

The output of the two power switch banks thus provide a high current square wave which drives a ferro-resonant transformer. This type of transformer, also known as a "Sola" regulator, is tuned by a resonating capacitor to provide a sinusoidal output of the same frequency as the high current square wave input. The ferro-resonant transformer produces reactive currents which make it necessary for the power switches to handle current in both directions when on. This output is then able to drive external electrical devices, such as lights, small motors, and electronic devices.

Due to the highly symmetrical production of the high-current square wave driving the ferro-resonant transformer, the minimal number of components in the overall circuit, and the deep saturation during turn-on of the power switches, the overall efficiency of the inverter in converting direct current electricity into alternating current electricity is approximately 80%.

The inverters of the present invention further incorporate a unique short-circuit and overload protection circuitry that prevents the power switches from overheating due to the switches operating in their linear regions; such linear operation occurs when excessive output current is demanded due to an overload or short-circuit on the output, or a D.C. voltage input greater than the design limit of the ferro-resonant transformer. In such cases, the power switch driving transistors are unable to maintain the power switch transistors in deep saturation thus generating a relatively large voltage drop across these power transistors. Since the power dissipated by these power transistors is equal to the voltage drop across the collector-emitter junction of the transistors times the amount of current flowing through the transistor, it is readily apparent that when supplying currents in the 100 ampere range, the heat generated can quickly reach catastrophic levels. However, due to the overload and the short-circuit protection circuitry in the present invention, the attempt by any of the power switch transistors to operate in their linear mode, and thus come out of deep saturation, causes the drive circuitry to the power switch drive transistors to cut off the base drive to that bank of power switch transistors. This cutoff prevents the current flow through that bank of transistors and causes the remaining bank of transistors to attempt to be driven into deep saturation. If, due to the short-circuit of overload, the remaining bank of transistors cannot be maintained in deep saturation, the overload and short-circuit protection circuitry switches to the first bank of transistors the drive current. This switching back and forth occurs at an extremely rapid rate so that no bank of power switches is maintained in the linear mode for more than a few microseconds. The resultant heating in these transistors is therefore minimal and thus catastrophic failure is averted.

The output of the inverter when such a condition arises, will not be at the rated voltage and current (VA rating) for the inverter but will be a somewhat lower voltage and current. In addition, the inverter will make a chattering noise, due to the high frequency switching in the power switches and ferro-resonant transformer. It is thus apparent to the operator or user of the present invention either by the low output voltage or by the noise generated by the inverter that a short-circuit or overload situation has occurred or that the input voltage from the battery source is greater than the designed limits of the ferro-resonant transformer. Thus, any condition which will tend to cause the power switches to come out of deep saturation during their energized or ON state will immediately activate the protection circuitry and thus prevent catastrophic failure in the inverter. The inverter also incorporates drive cutoff protection circuitry for the power switch transistors, if the oscillator or divider circuit fails. This circuitry also prevents catastrophic heating in the power switch and driver transistors.

Furthermore, the inverter incorporates a unique method for driving the power drive transistors by obtaining collector voltage from the ferro-resonant transformer. This tapped voltage allows the power drive transistors' collector voltages to be greater than the collector voltages on the power switch transistors during the energized or ON state. This insures the emitter follower configuration of the power drive transistor coupled to the power transistors to maintain the power transistors in deep saturation. Previously, an attempt for an emitter follower to drive power transistors in deep saturation when large collector currents were passed through the power transistors often caused the power transistors to come out of saturation due to the coupling of their collectors to the driver transistors' collectors. The present use of tapping voltage from the primary side of the ferro-resonant transformer alleviates this problem by providing more collector voltage for the drive transistor, thereby insuring proper saturation of the power transistors during normal operation.

Furthermore, the present invention utilizes two banks of power switch transistors wherein their collectors and bases are respectively connected in parallel and their emitters are coupled through internal or external resistors so as to match the current switching capabilities of the power transistors in the bank to one another. This current matching further insures symmetry in the high-current square wave which thus maximizes the inverter's efficiency.

Furthermore, the present invention uses a small, relatively low ampere switch for activating the circuit during a power failure. Prior art inverters generally require the use of a large, high-current DC voltage switch in order to activate the inverter when desired. However, this type of large current switch is not needed in the present invention since the power switches are always interconnected to the battery. It is only the control electronics that are energized when the switch is closed, which in turn causes the inverter to become activated. The amount of power loss due to the power switch's connections to the external battery is minimal in comparison to the power output of the inverter during its activation.

OBJECTS OF THE INVENTION

It is therefore a principal object of the present invention to provide a high-efficiency, low-cost, lightweight electronic DC to AC inverter.

A further object of the present invention is to provide an inverter of the above character that incorporates electronic overload and short-circuit protection that prevents catastrophic failure of the inverter, as well as alleviating the need for external fuses or circuit breakers.

Another object of the present invention is to provide an inverter of the above character that has protection against excessive direct current source input voltage which would cause ferro-resonant transformer saturation.

An additional object of the present invention is to provide an inverter of the above character that maintains its high efficiency by generating electronic signals of the desired frequency that are of perfect symmetry in order to minimize electrical heat losses within the inverter.

A further object of the present invention is to provide an inverter of the above character that may be energized with a low-current switch and therefore alleviate the need for a high-current DC switch between the external source of direct current and the inverter.

A still further object of the present invention is to provide an inverter of the above character that utilizes a power drive circuit that receives electrical energy from a portion of the output transformer of the inverter which therefore insures proper operation of the power switches of the present invention.

A further object of the present invention is to provide an inverter of the above character with a minimal number of components.

An additional further object of the present invention is to provide an inverter of the above character that is easy to fabricate and to troubleshoot.

A still further object of the present invention is to provide an inverter of the above character that is able to generate alternating current output electricity after a short-circuit, overload condition, or over input voltage condition is corrected without the need for replacing or switching any components of the inverter.

A further object of the present invention is to provide an isolated AC sine wave regulated power from a DC source which is lightweight and capable of producing over 25 watts of output for every pound of inverter weight.

Further objects of the present invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken connection with the accompanying drawings, in which:

FIG. 2A is an electrical waveform generated by an oscillator in an inverter according to the present invention;

FIG. 2B is an electrical output waveform of an oscillator divider circuit of an inverter according to the present invention;

FIG. 2C is another output waveform of the same divider circuit as shown in FIG. 2B;

FIG. 3A is an output voltage waveform of a portion of a push-pull amplifier of an inverter according to the present invention showing the voltage overshoot that occurs when a diode-capacitive-resistive network is not present;

FIG. 3B is an electrical voltage waveform similar to FIG. 3A but incorporating a diode-capacitive-resistive damping circuit; and FIG. 4 is an electrical current waveform showing reverse current flowing through the power switch.

DETAILED DESCRIPTION

Figure 1:
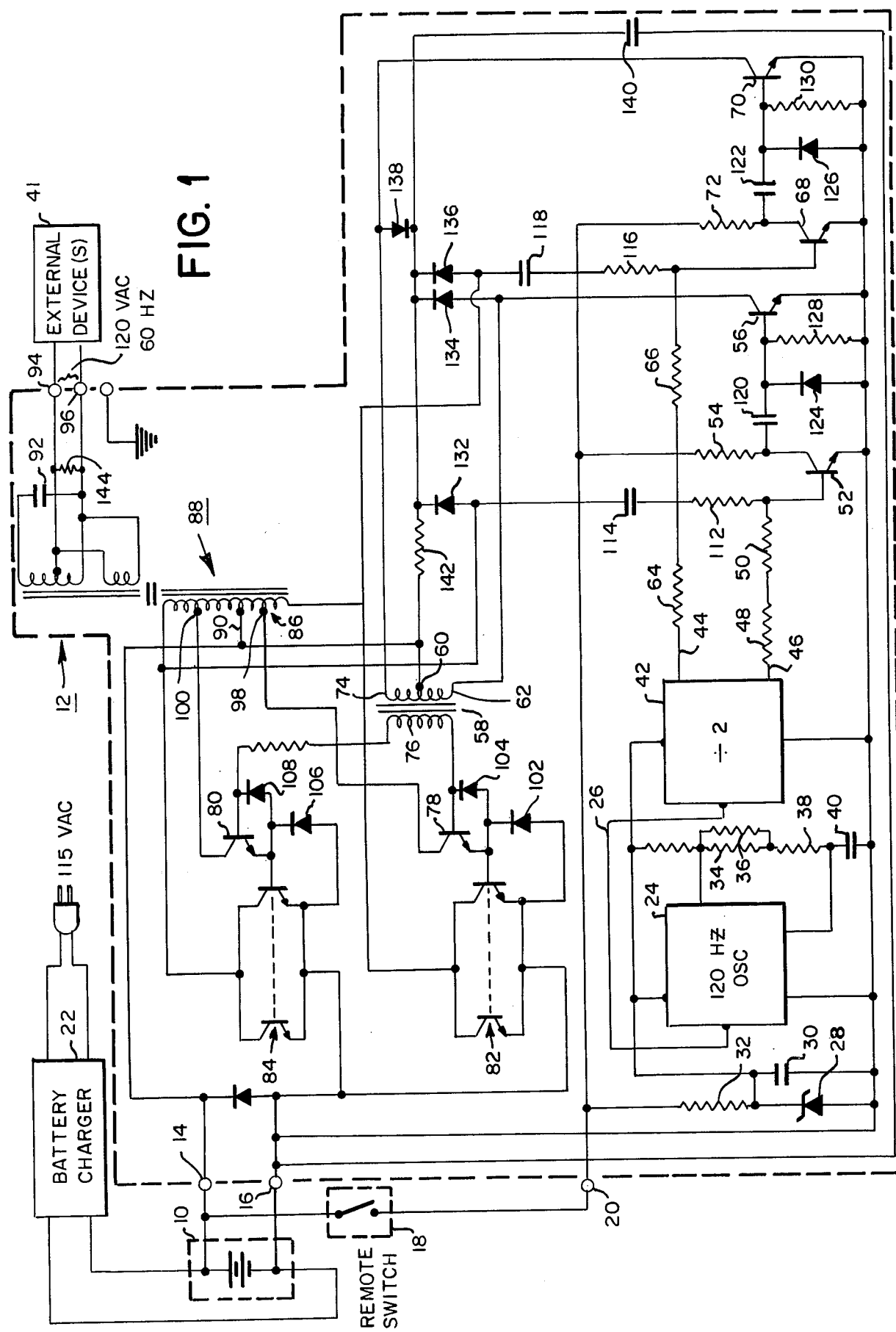
FIG. 1 is a schematic diagram of the electronic circuitry of an inverter according to the present invention.

As best seen in FIG. 1, a battery 10 is connected to an inverter 12 of the present invention by connectors 14 and 16. The battery in the preferred embodiment of the present invention may have a nominal voltage of from 12 VDC to 56 VDC depending upon the volt-amp (VA) output capability of the particular inverter.

A remote ON switch 18 interconnects with inverter 12 by connector 20 and is used to energize the control electronics of the inverter. This switch need only carry low-current electricity and is therefore small and inexpensive in comparison to DC switches found on many prior art inverters. These prior art DC switches energize the entire inverter circuitry while switch 18 only activates the low-power sections of the invention. A battery charger 22 is preferably connected to battery 10 to maintain the battery in a fully charged state and therefore allow the inverter to produce sinusoidal output electricity for the maximum length of time when activated.

The inverter 12 incorporates a 120 hertz oscillator 24 for the generation of a 120 hertz square wave output on circuit line 26. Although this oscillator is at 120 hertz, it is well known in the art that other frequencies may be chosen depending on the desired frequency of the alternating current output. The 120 hertz oscillator 24 is preferably an integrated circuit specifically designed for this purpose. Zener diode 28 and capacitor 30 and dropping resistor 32 are used to supply the oscillator 24 with a regulated preset DC voltage for which the oscillator is specifically designed.

Resistors 34, 36 and 38, along with capacitor 40 combine to form a 120 hertz RC timing network. Resistor 36 is inserted into this RC circuit in order to properly trim the circuit for a time constant of 120 hertz. Thus, the frequency of the oscillator 24 is set by the RC network to the desired 120 hertz.

The square wave 120 hertz signal on output line 26 is connected to integrated circuit 42 where this input signal is divided by a factor of 2. The integrated circuit 42 is actually an electronic flip-flop.

The output waveform on circuit line 26 is best seen in FIG. 2A. As seen in FIG. 2A, it is possible, and indeed probable, for the square wave output on this circuit line to have unequal time durations for its HIGH and LOW states. This lack of symmetry in the square wave output would have deleterious effects if the remaining circuitry in the inverter was driven by such a signal. The reason for such a deleterious effect is that lack of symmetry of a square wave necessitates a non-zero average value. A zero average value waveform is necessary for efficient operation of any transformer. Transformers are, of course, not designed for the transferral of direct current energy, and any signal imparted to a transformer with a direct current or non-zero average value will cause the transformer to dissipate this energy in the form of heat. Consequently, this energy is completely wasted with respect to driving external devices 41.

To overcome this difficulty, the divide by 2 integrated circuit 42 not only changes the frequency of the square waves from 120 hertz to 60 hertz, but also causes these square waves to be 180° out of phase, each with perfect HIGH and LOW symmetry. A typical waveform of these signals on output line 44 and output line 46 with relation to the 120 hertz input signal on line 26 may best be seen in FIGS. 2A, 2B, and 2C.

These 60 hertz square signals on output lines 44 and 46 are transferred to the first stages of a push-pull amplifier. Referring to output line 46, resistors 48 and 50 are used as voltage dropping resistors in order to properly energize and de-energize the base of a first stage transistor 52. When this first stage transistor 52 is energized by a HIGH signal on output line 46, the transistor is placed in saturation causing a low voltage at its collector. Resistor 54 is used to limit the collector current of the transistor. Transistor 52 in turn drives a second stage transistor 56, which interconnects with the primary side of a driver transformer 58. Thus, if transistor 52 is saturated, that is, in the ON state, transistor 56 is in the OFF state thereby preventing current flow between center tap 60 of the driving transformer and lower side 62 of the primary side of the driving transformer.

The drive circuitry for output line 44 of the divide by 2 integrated circuit 42 is identical with the previously described driving circuitry. Thus, resistors 64 and 66 are identical to resistors 48 and 50; transistors 68 and 70 are the same as transistors 52 and 56 respectively, and resistor 72 corresponds to resistor 54. The collector of the second stage transistor 70 is connected to the upper winding 74 of the primary side of driver transformer 58.

Thus, if the output signal circuit line 44 is in the HIGH state, the second stage transistor 70 is in the OFF condition thereby preventing current flow from the center cap 60 to the upper winding 74 of driving transformer 58. At the same time, the output from circuit line 46 is in the OFF or zero voltage state, thereby causing the second stage transistor 56 to be in the saturated or ON condition thereby allowing the D.C. voltage of battery 10 connected to the center tap 60 of the driver transformer to cause current flow through the lower winding 62 of that transformer. The reverse current flow occurs when the signal on output line 44 is in the zero voltage state and the corresponding signal on output line 46 is in the HIGH state.

Thus, the electrical signal generated on secondary winding 76 of the driving transformer is a 60 hertz square wave with plus and minus voltage levels equal to the voltages across the upper and lower windings of the primary side of the driver transformer multiplied by the voltage amplifcation factor of the driving transformer.

The output of the secondary side 76 of the driving transformer 58 is transferred to power switch driving transistors 78 and 80. These power switch driving transistors in turn control the operation of two banks of power switch transistors 82 and 84. These power switch transistors are used to generate a high current square wave across a primary side 86 of a ferro-resonant power transformer 88. Thus, when a positive current is placed across the base-emitter junction of power switch driving transistor 80, this transistor causes a relatively large emitter current to flow into the base-emitter junctions of the power switch transistor bank 84 in either direction. Thus, the transistors in this bank will be placed into depp saturation thereby causing a large flow of current from center tap 90 of the primary side of the ferro-resonant transformer, through this transistor bank, and back to the low voltage side of battery 10. Due to the current flow during certain intervals of time when the ferro-resonant transformer is producing reactive currents, the power switch bank must handle currents in both directions while remaining in deep saturation.

During the time when transistor bank 84 is in deep saturation, the transistor bank 82 is forced to be in the OFF state. Thus, minimal current flow occurs between center cap 90 and transistor bank 82. The next half cycle of the square wave on the secondary winding 76 of the driving transformer 58 causes the power switch driving transistor 78 to place the power switch transistor bank 82 into deep saturation and causing the resultant high current flow from the center tap 90 through the lower side of the primary winding, through this transistor bank, and back to the low side of battery 10. A square wave is thus obtained across the primary winding of the ferro-resonant transformer with a voltage span equal to twice the output voltage of battery 10.

The ferro-resonant transformer is also known in the art as a "Sola" regulator and has the desirable capability of transforming a square wave of varying amplitude into a sinusoidal wave of relatively constant amplitude with a frequency equal to the frequency of the square wave input. In order for this regulator to operate properly, it is necessary that a capacitor 92 be placed across its secondary winding side. This capacitor varies in capacitance depending upon the magnitude of the square wave voltage on the primary side of the regulator as well as the amount and type of external electrical loading placed across terminals 94 and 96 of the inverter.

It will be noted that terminals 94 and 96 are placed across a section of the secondary winding of the ferro-resonant transformer in order that the desired 120 VAC or any other output voltage can be obtained from the secondary winding to supply alternating current electricity to interconnected external devices. Different taps on the secondary can thus produce various output voltages other than 120 VAC. Such taps may be simultaneously used to drive a variety of external devices. In the general embodiment of the ferro-resonant transformer, the secondary side generally is at approximately 600 VAC in order to minimize the cost of capacitor 92.

In order to insure the proper saturation of the power switch transistor banks 82 and 84, it is necessary that the collector voltage on power switch driver transistors 78 and 80 be at a collecter voltage great enough to insure sufficient base to emitter current for power switch transistor banks 82 and 84. In the standard emitter follower technique of current amplification using two transistors, such as transistor 78 and transistor bank 82, the collectors of the two transistors are normally connected together. However, using such an arrangement in the present invention would prevent the transistor banks from going into deep saturation due to the relatively low voltage necessary at their collectors. This voltage may indeed be lower than the base voltage on the respective transistor bank, and thus connecting the collectors of transistors 78 and 82, or 80 and 84, would prevent the base-emitter junction of the respective transistor banks from going into a deep saturation state during turn-on. In order to alleviate this problem, the collectors on transistors 78 and 80 respectively receive their driving voltage from taps 98 and 100 of the ferro-resonant transformer. Thus, the collectors on transistors 78 and 80 are insured of being at a high enough voltage in order that the emitter voltage of these transistors is sufficient to cause the base-emitter junction of the transistor banks 82 and 84 to go into deep saturation.

Diodes 102, 104, 106, and 108 are alternately used to carry base current past the power switch which is turned off. A typical current path would travel through components 76, 110, 80, 84, 102, 104 back to component 76. Resistor 110 is used to limit the amount of current flowing through power switch driving transistor 78 or 80 whenever these transistors are in the ON state.

The unique overload, short-circuit and excessive input voltage protection circuitry comprises resistor 112 and capacitor 114 for the drive circuitry from output line 46 and resistor 116 and capacitor 118 for the drive circuitry connected to output line 44. These capacitors are respectively connected to the collector sides of power switch transistor banks 84 and 86 and therefore sense the collector voltage on these power switch banks. Thus, if the power switch bank 82 is in deep saturation, the collector voltage of these transistors should be close to 0 volts. In such a case, capacitor 118 and resistor 116 provide no current to the base-emitter junction of the first stage drive transistor 68. At the same time, this same junction receives no current from output line 44, since its output is in the LOW state. Thus, the output on the second stage transistor 70 is also at the ground state causing collector current to flow through transistor 70 and thus energizing the upper winding 74 of the primary side of the driving transformer 58. This in turn causes current flow through the power switch transistor bank 82, thereby maintaining this bank in deep saturation.

However, if for some reason the collector current through this transistor bank is too great to maintain the transistors of this bank in deep saturation, the collector voltage on this bank will begin to rise. The capacitor 118 will immediately sense this voltage rise and through resistor 116 will cause transistor 68 to be turned ON, consequently causing transistor 70 to be turned OFF, which in turn, via driving transformer 58, will cause the power switch transistor bank 82 to be turned to the OFF state. Thus, the sensing of rising collector voltage at a time when it is not supposed to appear, that is, at a time when the power switch transistor bank should be in the saturated state, will immediately cause that transistor bank to be switched to the OFF state.

At that same instant, the other power switch transistor bank would be switched to the ON state regardless of the state of the corresponding output line 44 or 46. That is, once an overload, short-circuit or over voltage battery condition is sensed by the increase in the collector voltage on either of the power switch transistor banks, the respective short-circuit, overload protection circuit will cause that particular transistor bank to be switched to the OFF condition. The other bank will then be switched to the ON state until it has a rise in collector voltage. This oscillation from turning off one transistor bank to turning on the other transistor bank will repeat itself at an extremely fast rate thereby insuring that neither transistor bank is placed in linear mode operation for more than a few microseconds span and always at a relatively low voltage. Therefore, the power switch transistor banks are prevented from going into catastrophic failure due to excessive heat dissipation that would occur if they were operated in the linear mode.

Thus, the unique overload and short-circuit protection of the present invention not only furthers the deep saturation or cut-off of the respective power switch transistor banks when the inverter is operating normally but also senses any deviation in the output current of the inverter or a short-circuit or too great a voltage from the battery input thereby preventing any form of catastrophic failure within the inverter.

Upon removal of the malfunction, whether it be an overload or a short-circuit across the output or too high a battery voltage on the input, the inverter will immediately resume normal operation without the need for any external switching or re-energizing of any components. The advantageous feature is a great advantage over present-day use of output fuses on inverters, since not only must these fuses be replaced when they are blown but generally these fuses are unable to respond rapidly enough to linear mode operation in the power transistors in order to prevent catastrophic failure of these power transistors.

Furthermore, the present invention incorporates capacitors 120 and 122 which prevent the catastrophic failure of any of the components within the inverter if the 120 hertz oscillator 24 or the divide by 2 integrated circuit 42 fail to operate normally. If either should fail to function properly, the output voltages on output lines 44 and 46 will remain at a high or low voltage. Thus, transistors 52 and 68 would either be saturated or cut-off depending upon the voltage on 46 and 44. However, capacitors 120 and 122 prevent the direct current flow from transistors 52 and 68 to transistors 56 and 70 respectively if a DC voltage is maintained at either transistors 52 or 68. At such times, transistors 56 and 70 are both placed in the OFF state thereby preventing the driver transformer 58 from operating and thereby cutting off power switch drive transistors 78 and 80, which in turn prevent current flow through power switch banks 82 and 84. Thus, if the oscillator of the inverter failed, the inverter would simply have no output voltage on its output terminals 94 and 96. No catastrophic failure of any of the remaining parts of the inverter would occur.

Diodes 124 and 126 are used to discharge capacitors 120 and 122 respectively when the inverter is operating normally. Resistors 128 and 130 are used to properly bleed off any switching current when transistors 56 and 70 go from the ON to OFF state.

Diodes 132, 134, 136 and 138 along with capacitor 140 prevent large voltage overshoot on the collectors of second drive transistors 56 and 70 as well as the collector sides of power switch transistor banks 82 and 84. As best seen in FIG. 3A, the overshoot on these transistors would be approximately equal to the battery voltage and could indeed cause transistor breakdown due to this sudden transient. However, as best seen in FIG. 3B, with the use of the diode capacitor network the voltage overshoot is substantially reduced during switchoff times for these transistors.

As also seen in FIG. 3B, the collector voltage during OFF time for transistors 56 and 70 and power switch transistor banks 82 and 84 is substantially smoother with the diode capacitor network. It should be noted that resistor 142 is used in conjunction with capacitor 140 to discharge the voltage across capacitor 140 that occurs during the initial switchoff times of these transistors. Thus, the current is drawn from capacitor 140 through resistor 142 and back to the plus side of battery 10. The overshoot energy is therefore transformed into heat energy as dissipated by resistor 142.

Furthermore, to insure the proper operation of the inverter when no load is placed across the secondary of the ferro-resonant transformer 88 at connectors 94 and 96, it may be necessary to add a preload 144 across the output terminals of the secondary side of the ferro-resonant transformer. This preload is preferably a resistive or resistive-capacitive load, and its purpose is to prevent the resonant transformer from oscillating at a frequency other than the driving frequency of the high-current input square wave when no load is placed across the output terminals.

Thus, what has been described is a low-cost and highly efficient inverter for converting direct current electricity into alternating current electricity. The inverter incorporates an inexpensive oscillator wherein the generated oscillation is divided by two to provide a highly symmetrical 60 hertz square wave signal for driving the output stages of a pair of power switches. The driving circuitry incorporates overload, short-circuit and high input voltage protection that senses the collector voltage across the power switch transistors whereby any tendency for these power switch transistors to come out of deep saturation during turn-on will automatically cause the switches to be turned off, thus preventing catastrophic heating. Furthermore, the push-pull amplifier incorporates means for preventing any driving to the push-pull power switch transistor banks when the oscillator or the divide by 2 circuitry fails for any reason.

In addition, the present invention includes means for obtaining energizing voltages to the emitter follower transistors that drive the power switch transistor banks so as to insure that the power switch driver transistors are able to maintain the power switch transistors in deep saturation during turn-on. In addition, the present invention includes means for preventing large voltage overshoots on the power switch transistors as well as the second stage transistors through the use of a diode-capacitive-resistive network.

Thus, the present invention is able to provide any desired alternating current voltage at any low frequency provided that the oscillator used in the inverter is chosen to provide such a frequency. In addition, the present invention eliminates the need for a high-current, direct voltage switch from the battery to the inverter for activating the inverter. Instead, a low-current, direct voltage switch of substantially less cost and size is used.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An electronic inverter for converting direct current electrical energy into alternating current electrical energy comprising:
   A. an oscillator having a frequency equal to an integral multiple of the desired alternating current frequency;
   B. a divider circuit connected to the output of the oscillator for generating a pair of 180° out of phase 50% duty cycle square waves;
   C. a push-pull amplifier connected to the 180° out of phase square wave outputs of the divider circuit for amplifying these outputs into a high-current square wave said push-pull amplifier incorporating:
      1. two sets of bi-directional current flow electronic power switches; and
      2. overload protection means connected to said switches for terminating driving energy to the power switches when said power switches are in an out of saturation condition;
   D. a ferro-resonant transformer connected to the high-current square wave output of the push-pull amplifier for generating a substantially sinusoidal electrical output; and
   E. means for terminating the driving energy to the electronic power switches when the outputs from the divider circuit are not oscillating.

2. An electronic inverter for converting direct current electrical energy into alternating current electrical energy comprising:
   A. an oscillator having a frequency equal to an integral multiple of the desired alternating current frequency;
   B. a divider circuit connected to the output of the oscillator for generating a pair of 180° out of phase 50% duty cycle square waves;
   C. a push-pull amplifier connected to the 180° out of phase square wave outputs of the divider circuit for amplifying these outputs into a high-current square wave; said push-pull amplifier incorporating:
      1. two sets of bi-directional current flow electronic power switches; and
      2. overload protection means connected to said switches for terminating driving energy to the power switches are in an out of saturation condition;
   D. a ferro-resonant transformer connected to the high-current square wave output of the push-pull amplifier for generating a substantially sinusoidal electrical output; and
   E. a low-current switch for energizing the oscillator, divider circuit, and at least a portion of the push-pull amplifier whereby the inverter is activated when said switch is closed.

3. An electronic inverter as defined in claim 2, wherein said electronic power switches are fixedly connected to an external source of direct current electrical energy.

4. An electronic inverter for converting direct current electrical energy into alternating current electrical energy comprising:
   A. an oscillator having a frequency equal to an integral multiple of the desired alternating current frequency;
   B. a divider circuit connected to the output of the oscillator for generating a pair of 180° out of phase 50% duty cycle square waves;
   C. a push-pull amplifier connected to the 180° out of phase square wave outputs of the divider circuit for amplifying these outputs into a high-current square wave; said push-pull amplifier incorporating:
      1. two sets of bi-directional current flow electronic power switches;
      2. a pair of emitter follower transistors driving the two sets of electronic power switches, wherein the electrical energy supplying the collectors of these emitter follower transistors is substantially higher than the saturation collector voltage on the electronic power switches; whereby said power switches are insured of being placed into a deep saturation state during turn-on of the respective emitter follower transistors; and
      3. overload protection means connected to said switches for terminating driving energy to the power switches when said power switches are in an out of saturation condition; and
   D. a ferro-resonant transformer connected to the high-current square wave output of the push-pull amplifier for generating a substantially sinusoidal electrical output.

5. An electronic inverter as defined in claim 4, further comprising electrical energy coupling means connected to the ferro-resonant transformer wherein said coupling means are connected to the collectors of said emitter follower transistors for maintaining the collector voltages on these transistors substantially greater than the collector voltages on the electronic power switches for maintaining said switches in deep saturation during turn-on.

* * * * *

UNITED STATES PATENT AND TRADEMARK OFFICE
CERTIFICATE OF CORRECTION

PATENT NO. : 3,946,301
DATED : March 23, 1976
INVENTOR(S) : Roger R. Love

It is certified that error appears in the above-identified patent and that said Letters Patent are hereby corrected as shown below:

Column 2, line 22, cancel "and" and substitute therefor
--any--
Column 2, line 48, cancel "or" and substitute therefor
--of--
Column 3, line 5, cancel "such" and substitute therefor
--Such--
Column 3, line 29, cancel "of overload" and substitute therefor
--or overload--
Column 5, line 27, add after "taken"
--in--

Column 7, line 26, cancel "amplifcation" and substitute therefor
--amplification--
Column 7, line 40, cancel "depp" and substitute therefor
--deep--
Column 7, line 41, cancel "tap" and substitute therefor
--cap--

Column 9, line 58, cancel "The" and substitute therefor -- This-

Signed and Sealed this nineteenth Day of July 1977

[SEAL]

Attest:

RUTH C. MASON
*Attesting Officer*

C. MARSHALL DANN
*Commissioner of Patents and Trademarks*